(12) United States Patent
Zhu (10) Patent No.: US 8,018,533 B2
(45) Date of Patent: Sep. 13, 2011

(54) INDEPENDENT CHROMINANCE CONTROL METHOD AND SYSTEM FOR IMAGES

(75) Inventor: Ge Zhu, Shanghai (CN)

(73) Assignee: Huaya Microelectronics, Ltd, San Jose, CA (US)

( * ) Notice: Subject to any disclaimer, the term of this patent is extended or adjusted under 35 U.S.C. 154(b) by 1316 days.

(21) Appl. No.: 11/493,047

(22) Filed: Jul. 26, 2006

(65) Prior Publication Data

US 2007/0024758 A1   Feb. 1, 2007

(30) Foreign Application Priority Data

Jul. 27, 2005   (CN) .......................... 2005 1 0028158

(51) Int. Cl.
*H04N 9/793* (2006.01)
*H04N 9/64* (2006.01)
(52) U.S. Cl. ........ 348/645; 348/644; 348/650; 348/649; 382/167; 358/518
(58) Field of Classification Search .................. 348/645, 348/649, 650, 644, 603, 630, 713, 577, 654, 348/655, 662; 382/167, 162; 358/518, 520
See application file for complete search history.

(56) References Cited

U.S. PATENT DOCUMENTS

| 4,679,072 | A  | * | 7/1987 | Takayama | 358/520 |
| 5,289,295 | A  | * | 2/1994 | Yumiba et al. | 358/518 |
| 6,868,179 | B2 | * | 3/2005 | Gruzdev et al. | 382/167 |
| 7,405,771 | B2 | * | 7/2008 | Lee et al. | 348/645 |
| 7,483,082 | B2 | * | 1/2009 | Chou | 348/645 |

* cited by examiner

*Primary Examiner* — M. Lee
*Assistant Examiner* — Jean W Désir
(74) *Attorney, Agent, or Firm* — Silicon Valley Patent Group, LLP; Edward Mao (57) ABSTRACT

A method and system for adjusting selected colors of an image is presented. A chrominance adjustment system in accordance with one embodiment of the present invention, determines whether the color of the current pixel is near a selected color. When the color of the current pixel is near the selected color the chrominance adjustment system calculates a color specific chrominance adjustment factor based on the current color and the selected color and adjusts the color of the current pixel using the color specific chrominance adjustment factor.

29 Claims, 6 Drawing Sheets

INDEPENDENT CHROMINANCE CONTROL METHOD AND SYSTEM FOR IMAGES

BACKGROUND OF THE INVENTION

1. Field of the Invention

The present invention relates to digital image and video processing. More specifically, the present invention relates to methods of independently controlling chrominance for selected colors in a video signal.

2. Discussion of Related Art

Due to advancing semiconductor processing technology, integrated circuits (ICs) have greatly increased in functionality and complexity. With increasing processing and memory capabilities, many formerly analog tasks are being performed digitally. For example, most video processing and image processing tasks are performed using digital imaging systems. For example, digital cameras are rapidly replacing analog film cameras in both commercial and consumer applications. However, a major problem with digital video/imaging systems is color fidelity. For example, an image captured by a digital camera may appear to have accurate color in the camera. However, when the image is downloaded to a computer, the computer display is unlikely to produce the same color as shown on the display of the camera. Furthermore, when the image is printed on a printer the printed image is unlikely to match either the camera display or the computer display.

Most display devices (and printers) do have controls to adjust colors. However, the color adjustments change all the colors in the display. Thus, for example in an image of a person in front of a row of trees, enhancing the greenness of the trees will likely give the person a sickly green tinge. Hence, there is a need for a method or system that can adjust some colors in an image without changing the appearance of other colors in the image.

SUMMARY

Accordingly, the present invention provides a method and system for adjusting chrominance of selected colors of an image without changing the non-selected colors. Specifically, a chrominance adjustment system in accordance with one embodiment of the present invention, determines whether the color of the current pixel is near a selected color. When the color of the current pixel is near the selected color the chrominance adjustment system calculates a color specific chrominance adjustment factor based on the current color and the selected color and adjusts the color of the current pixel using the color specific chrominance adjustment factor.

The color of the current pixel is near the selected color when the color of the current pixel lies within a color nearness angle of a selected color vector representing the selected color. To simplify the calculations involved in determining whether the color of the current pixel is near the selected color, some embodiments of the present invention use a color adjustment unit having a coordinate transformation unit and an adjustment calculation unit. The coordinate transformation unit rotates the colors space, so that in a transformed color space, the selected color vector is aligned with a coordinate axis of the transformed color space.

For multiple selected colors, a color specific chrominance adjustment factor is calculated for each selected color. The color specific chrominance adjustment factors are combined to form a pixel chrominance adjustment factor, which is used to adjust the color of the current pixel. The present invention will be more fully understood in view of the following description and drawings.

DETAILED DESCRIPTION

As explained above using conventional color adjustment techniques to change one color in an image changes the appearance of other colors in the image. The present invention allows enhancement or weakening of one or more selected colors without changing the appearance of other colors. Specifically, the present invention detects whether the color of a pixel is near one of the selected colors. Pixels with colors that are near one of the selected colors are enhanced or weakened by changing the saturation of the pixel.

Figure 1:
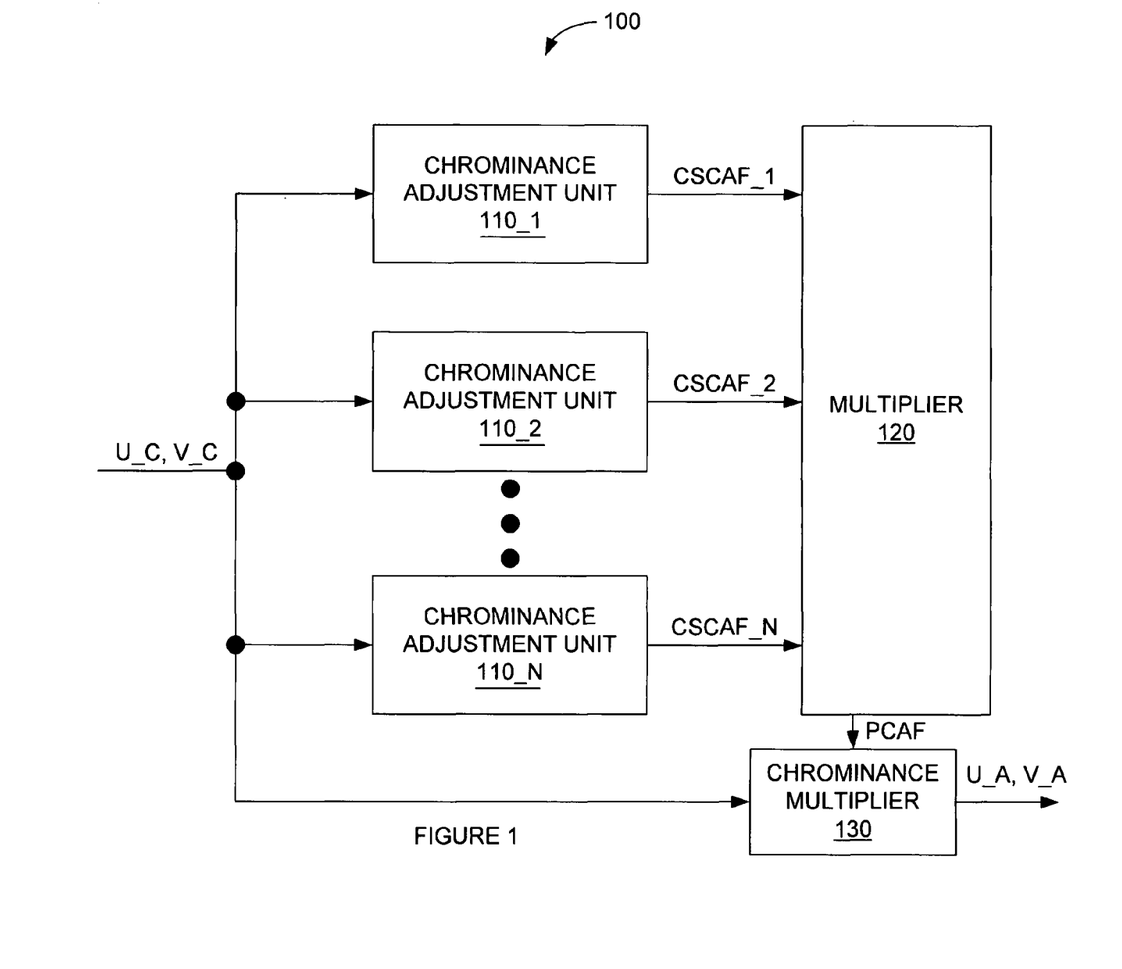
FIG. 1 is a block diagram of a selective chrominance adjustment system in accordance with one embodiment of the present invention.

FIG. 1 is a block diagram of a selective chrominance adjustment system 100 in accordance with one embodiment of the present invention. Selective chrominance adjustment system 100 processes images in YUV format. Images in other format should be converted into YUV format prior to processing. Selective chrominance adjustment system 100 includes a set of N chrominance adjustment units 110_1-110_N, a multiplier 120, and a chrominance multiplier 130. For each pixel in the image being processed, chrominance adjustment units 110_1 to 110_N receive the U chrominance value U_C and V chrominance value V_C of a current pixel. Chrominance adjustment units 110_1 to 110_N calculate a set of color specific chrominance adjustment factors CSCAF_1 to CSCAF_N, respectively, as described below. Multiplier 120 receives color specific chrominance adjustment factors CSCAF_1 to CSCAF_N and produces a pixel chrominance adjustment factor PCAF by multiplying all the color specific chrominance adjustment factors together. Chrominance multiplier 130 produces adjusted U chrominance value U_A and adjusted V chrominance value V_A by multiplying pixel chrominance adjustment factor PCAF with U chrominance value U_C and V chrominance value V_C, respectively. As described below, some embodiments of the present invention may modify pixel chrominance adjustment factor PCAF to keep the values of adjusted U chrominance value U_A and adjusted V chrominance value V_A within a specified limit.

As is well known in the art, multiplying both the U chrominance value and V chrominance value of a pixel by a common multiplier changes the saturation of the pixel without changing the hue of the pixel. Increasing the saturation of a pixel enhances the color of the pixel and decreasing the saturation decreases the color of the pixel. Thus, pixel chrominance adjustment factor PCAF modifies the saturation of the current pixel and thus is used to enhance or decrease the color of the current pixel. As explained in more detail below each chrominance adjustment unit is attuned to a selected color. Only pixels having colors near a selected color are modified by selective chrominance adjustment system 100.

Figure 2:
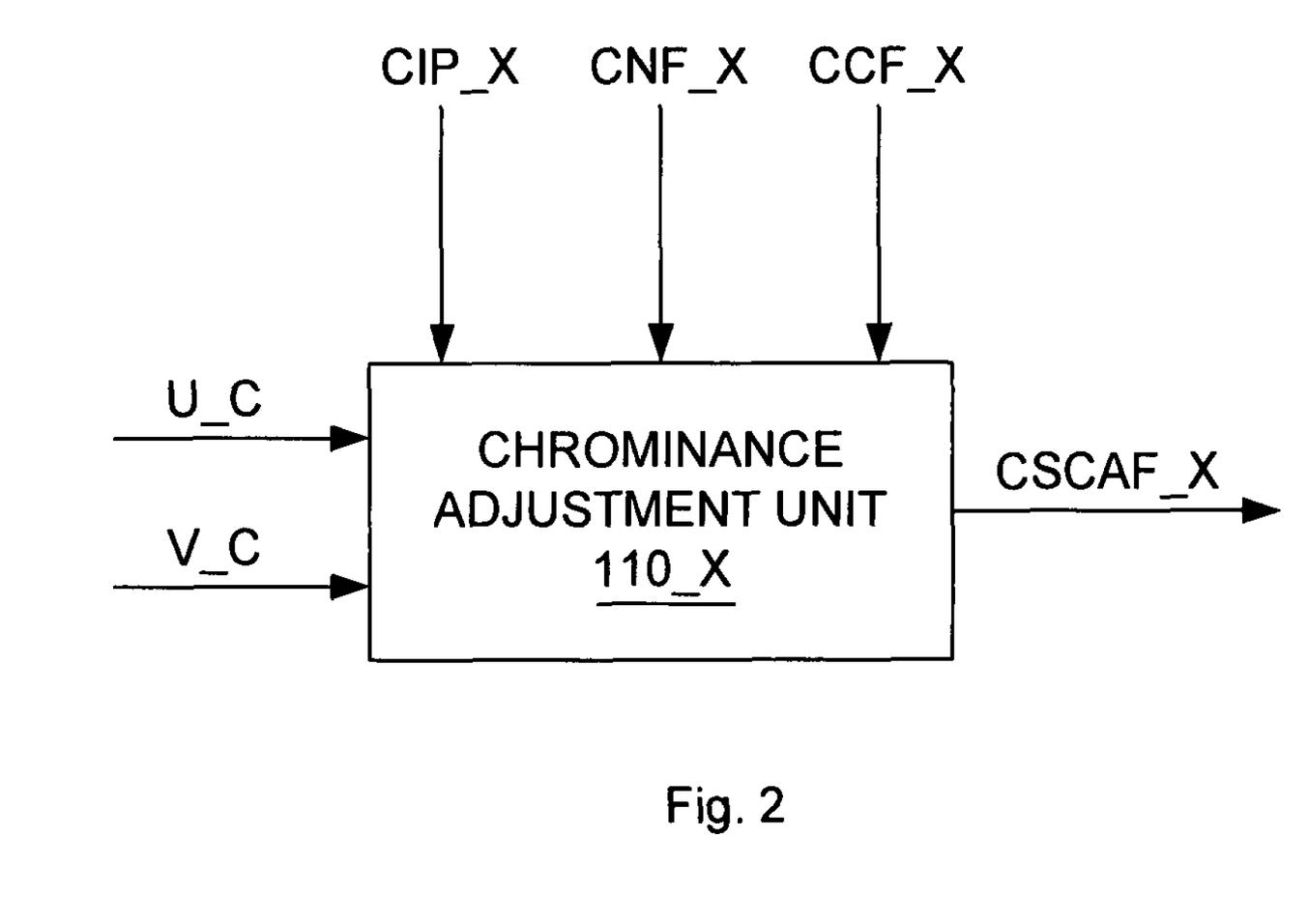
FIG. 2 is a block diagram of a chrominance adjustment unit in accordance with one embodiment of the present invention.

FIG. 2 shows an embodiment of a chrominance adjustment unit 110_X, which receives one or more color identification parameters CIP_X, a color nearness factor CNF_X, and a chrominance control factor CCF_X. Chrominance adjustment unit 110_X is attuned to a selected color C_X that is defined by color identification parameters CIP_X. If the color of the current pixel is near color C_X, then chrominance adjustment unit 110_X calculates a color specific chrominance adjustment factor CSCAF_X that is used to adjust the chrominance values of the current pixel to enhance or decrease the saturation of the current pixel. The range of colors that are near color C_X is determined by color nearness factor CNF_X and the value of color specific chrominance adjustment factor CSCAF_X is calculated using chrominance control factor CCF_X. If the color of the current pixel is not near color C_X, chrominance adjustment unit 110_X sets color specific chrominance adjustment factor CSCAF_X equal to one so that pixel chrominance adjustment factor PCAF is not affected by chrominance adjustment unit 110_X (see FIG. 1).

Figure 3:
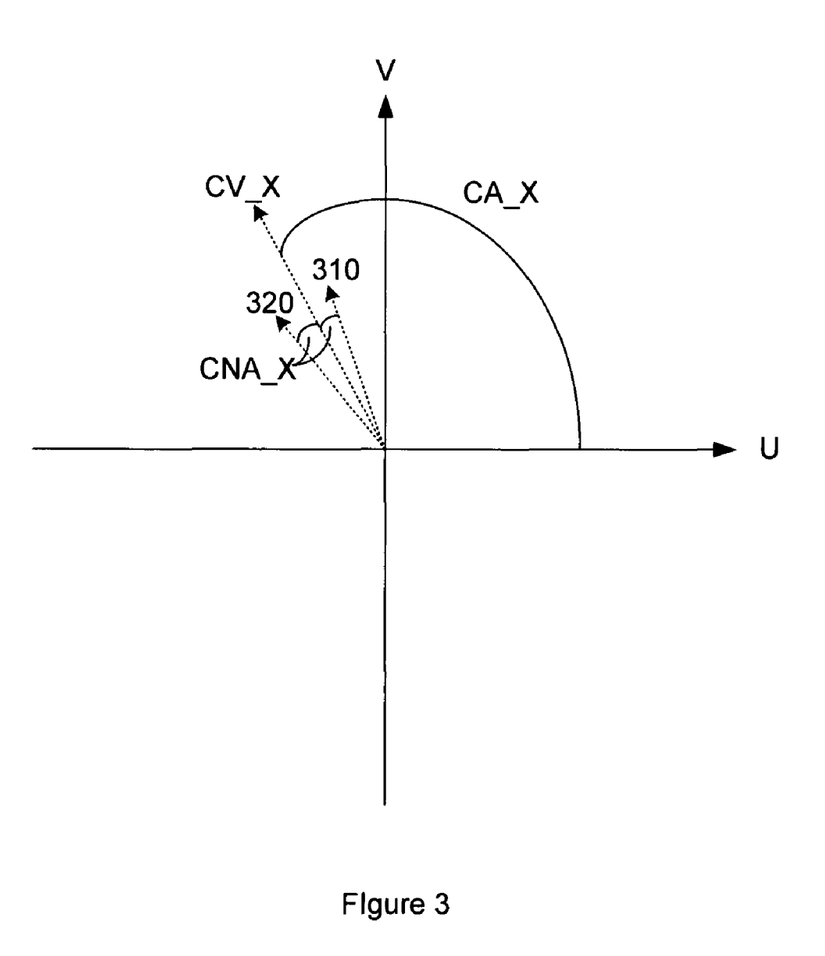
FIG. 3 illustrates color nearness in a color space used by embodiments of the present invention.

FIG. 3 illustrates the principles used in one embodiment of the present invention to determine if a pixel is near a selected color C_X. Specifically, FIG. 3 illustrates the U/V color space with U chrominance on the horizontal axis and V chrominance on the vertical axis. In the U/V color space, a "color" encompasses all points on a color vector starting from the origin. The points along the color vector differ in saturation, with the origin being colorless, i.e. 0 saturation, and increasing saturation as the point moves away from the origin. Therefore, color can be defined using color vector CV_X, which can be calculated from a color coordinate (U, V) or defined by a color angle (see FIG. 3). In FIG. 3, color identification parameter CIP_X is equal to a color angle CA_X defined as the angle between color vector CV_X and the positive U chrominance axis. Standard polarity of angles is used so that positive angles go counter clockwise and negative angles go clockwise. Color nearness factor CNF_X is defined using a color nearness angle CNA_X. The color of the current pixel is adjusted if the color falls within color vector 310 having a color angle of color angle CA_X minus color nearness angle CNA_X and color vector 320 having a color angle of color angle CA_X plus color nearness angle CNA_X (see FIG. 3).

Color specific chrominance adjustment factor CSCAF_X, which is used to adjust the color of the current pixel, is controlled by chrominance control factor CCF_X. A positive value of chrominance control factor CCF_X enhances the color while a negative value of chrominance control factor CCF_X decreases the color. Furthermore, the magnitude of color specific chrominance adjustment factor CSCAF_X is controlled by the magnitude of chrominance control factor CCF_X (as explained below). Chrominance control factor CCF_X can be set to zero to disable color adjustment. The exact formula to calculate the color adjustment can vary between embodiments. In general the color adjustment should be strongest when the color coordinate of the current pixel is on color vector CV_X. The adjustment strength should decrease as the distance between color coordinate of the current pixel and the color vector CV_X increases.

Figure 4:
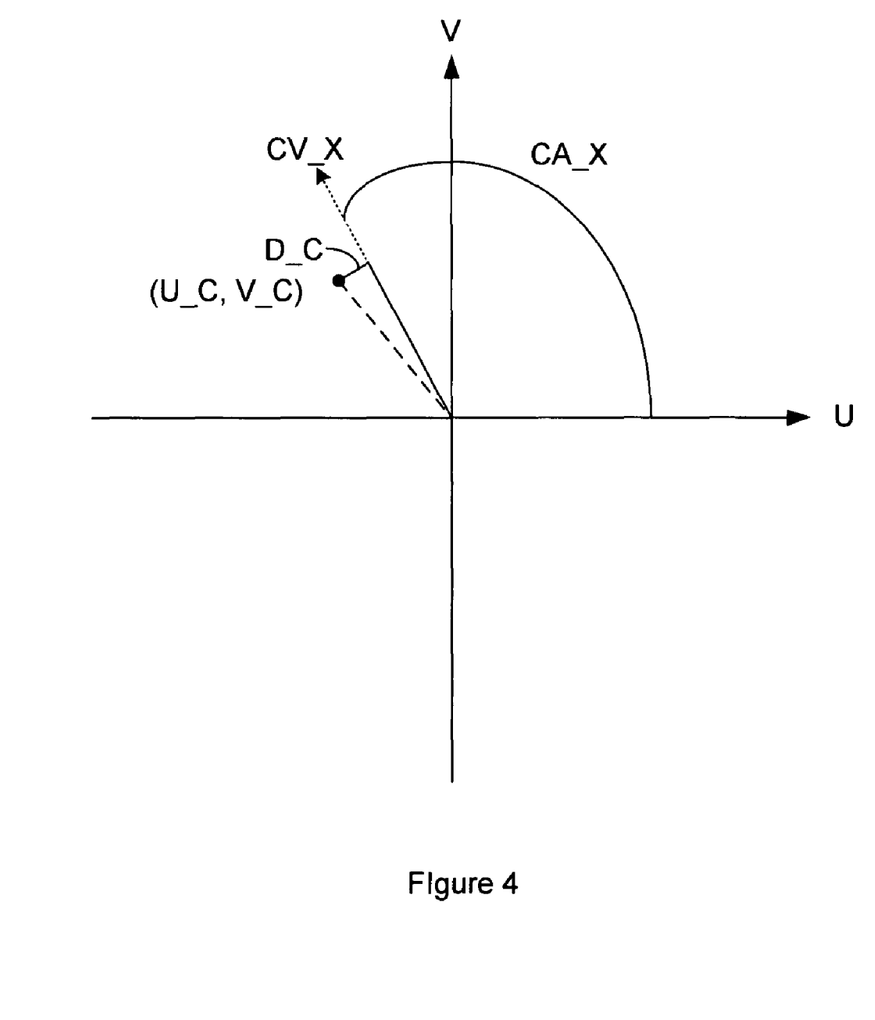
FIG. 4 shows the color coordinate of the current pixel in a color space used by embodiments of the present invention.

Thus, in one embodiment of the present invention the color adjustment depends on the distance between the color coordinate of the current pixel and color vector CV_X. As illustrated in FIG. 4, the color-coordinate of the current pixel in the U/V plane is color coordinate (U_C, V_C), i.e., the U chrominance and V chrominance value of the current pixel. The distance between the color coordinate of the current pixel and color vector CV_X is the perpendicular distance labeled D_C (hereinafter referred to as current distance D_C).

Figure 5:
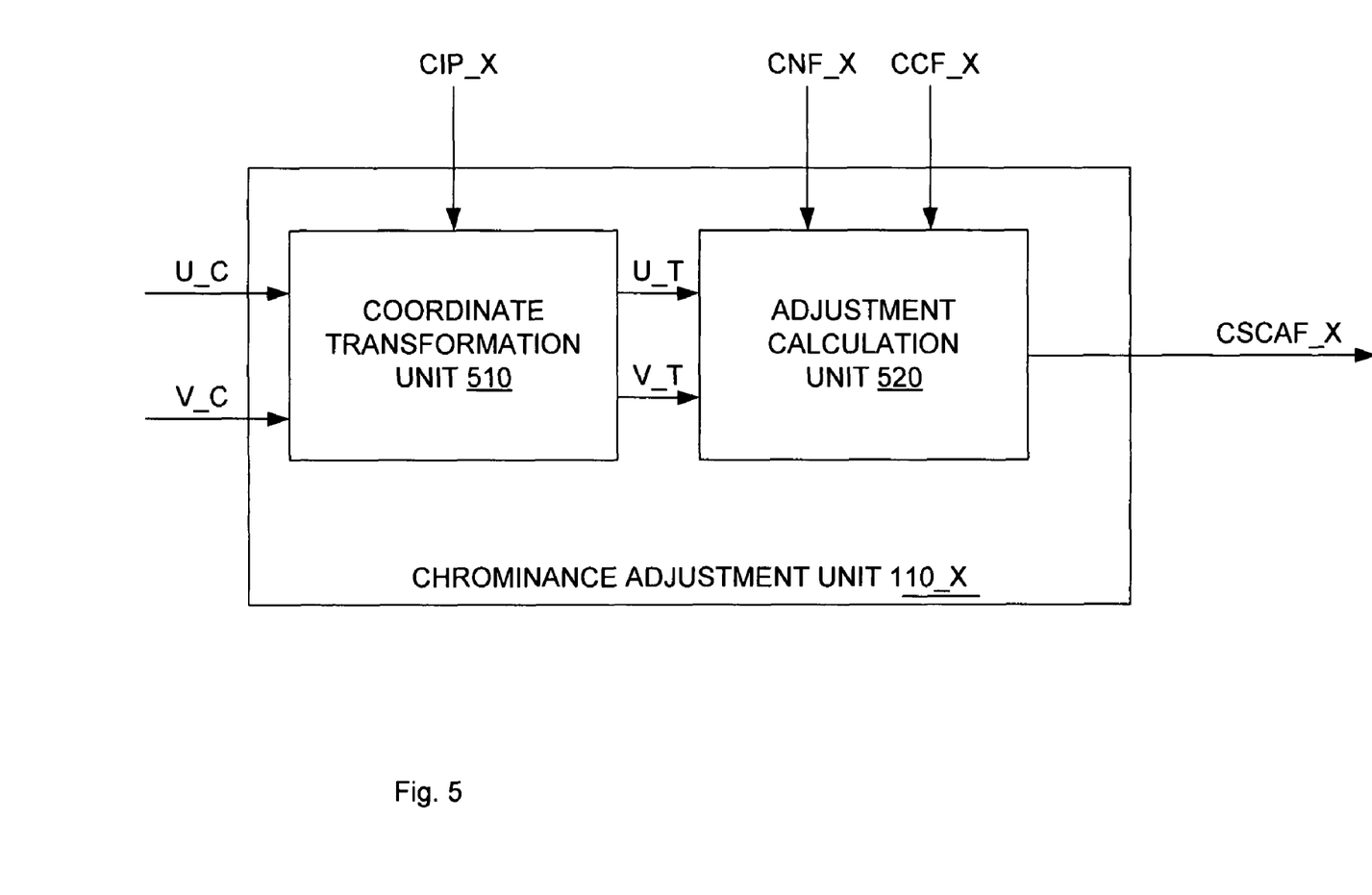
FIG. 5 is a block diagram of a chrominance adjustment unit in accordance with another embodiment of the present invention.

However, determining whether color coordinate (U_C, V_C) is within color vectors 310 and 320 (FIG. 3) and calculating color specific chrominance adjustment factor CSCAF_X typically requires trigonometric calculations. Video images would require enormous processing power on general-purpose computers or enormous silicon resources for on dedicated display controllers to perform the trigonometric functions in real time. Accordingly, another embodiment of the present invention uses a two-step process to simplify the calculation of color specific chrominance adjustment factor CSCAF_X. FIG. 5 shows another embodiment of chrominance adjustment unit 110_x. In the embodiment of FIG. 5, chrominance adjustment unit 110_X includes a coordinate transformation unit 510 and an adjustment calculation unit 520. Coordinate transformation unit 510 transform the U/V color space so that the transformed V Chrominance axis lines up with color vector CV_X, which greatly simplifies the calculation of color specific chrominance adjustment factor CSCAF_X. Specifically, coordinate transformation unit 510 calculates a transformed U chrominance value U_T and a transformed V chrominance value V_T in the transformed color space based on the values of color identification parameter CIP_X, U chrominance value U_C, and V chrominance value V_C.

As shown in FIG. 3, color vector CV_X can be defined by color angle CA_X. Transformed U chrominance value U_T is equal to U chrominance value U_C multiplied by the cosine of color angle CA_X plus V chrominance value V_C multiplied by the sine of color angle CA_X. Equation EQ1 shows symbolically how to calculate transformed U chrominance value U_T.

$$U\_T=U\_C*COS(CA\_X)+V\_C*SIN(CA\_X) \tag{EQ1}$$

Transformed V chrominance value V_T is equal to V chrominance value V_C multiplied by the cosine of color angle CA_X minus U chrominance value U_C multiplied by the sine of color angle CA_X. Equation EQ2 shows symbolically how to calculate transformed U chrominance value U_T.

$$V\_T=V\_C*COS(CA\_X)-U\_C*SIN(CA\_X) \tag{EQ2}$$

Directly providing the sine and cosine of color angle CA_X instead of providing color angle CA_X to coordinate transformation unit 510 can further simplify the calculations required in chrominance adjustment unit 110_X.

Figure 6:
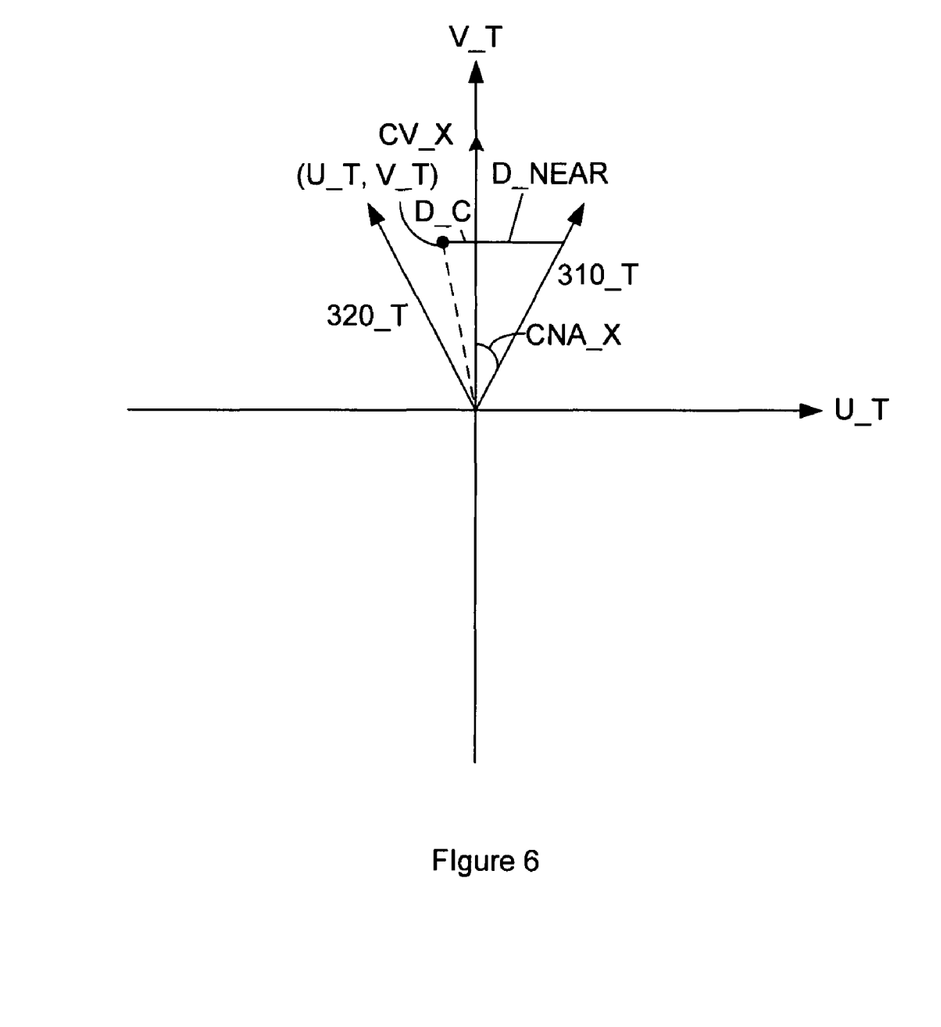
FIG. 6 illustrates the transformed color space used in one embodiment of the present invention.

Adjustment calculation unit 520, which receives transformed U chrominance value U_T, transformed V chrominance value V_T, color nearness factor CNF_X, and chrominance control factor CCF_X, calculates color specific chrominance adjustment factor CSCAF_X. In the transformed color space as illustrated in FIG. 6, current distance D_C is equal to the absolute value of transformed U chrominance value U_T. A nearness distance D_NEAR is defined as the horizontal distance between vector 310_T and the vertical axis at transformed V chrominance value V_T in the transformed color space. Vector 310_T is transformed version of vector 310 (from FIG. 3) and thus has a color angle CNA_X from the vertical axis. Therefore, nearness distance D_NEAR is equal to transformed V chrominance value V_T multiplied by the tangent of color nearness angle CNA_X. In general, color nearness angle CNA_X should be between zero and PI/2 radians. In a particular embodiment of the present invention color nearness angle CNA_X is PI/3 radians (i.e. 60 Degrees). By symmetry, nearness distance D_NEAR could also be calculated using vector 320_T, which is a transformed version of vector 320. Providing a color nearness factor equal to the tangent of color nearness angle CNA_X rather than color nearness angle CNA_X eliminates the need to calculate tangents within chrominance adjustment unit 110_X.

If nearness distance D_NEAR is less than current distance D_C, which is the absolute value of transformed U chrominance value U_T, then the color of the current pixel is not adjusted and color specific chrominance adjustment factor CSCAF_X is set equal to one. However, if distance D_NEAR is greater than or equal to the absolute value of transformed U chrominance value U_T (i.e. current distance D_C), color specific chrominance adjustment factor CSCAF_X is set equal to one plus chrominance control factor CCF_X multiplied by one minus the absolute value of transformed U chrominance value U_T divided by the sum of one and the product of transformed V chrominance value V_T and the tangent of color nearness angle CNA_X. Equation EQ3 shows symbolically the formula for color specific chrominance adjustment factor CSCAF_X.

$$CSCAF\_X = 1 + CCF\_X*(1 - ABS(U\_T)/(1 + V\_T*TAN(CNA\_X))) \quad (EQ3)$$

Color specific chrominance adjustment factor CSCAF_X should not be negative. Therefore if color specific chrominance adjustment factor CSCAF_X is negative using equation EQ3, color specific chrominance adjustment factor CSCAF_X is set equal to zero, which causes adjusted U chrominance value U_A and adjusted V chrominance value V_A to be zero, i.e. a colorless pixel.

As explained above, the tangent of color nearness angle CNA_X should be provided as color nearness factor CNF_X. Thus, the embodiment of FIG. 5 can calculate color specific chrominance adjustment factor CSCAF_X without having to perform trigonomic functions. Although certain values of trigonomic functions are used to calculate color specific chrominance adjustment factor CSCAF_X, these values (i.e., the sine of color angle CA_X, the cosine of color angle CA_X, and the tangent of color nearness angle CNA_X) are provided to chrominance adjustment unit 110_X. Accordingly, chrominance adjustment unit 110_X in accordance with the embodiment of FIG. 5 requires less processing power and less silicon area than the embodiments of the invention implementing equation EQ1, EQ2 and EQ3 directly.

Some embodiments of the present invention further reduce the complexity of chrominance adjustment unit 110_X by using a look up table to eliminate the division function in equation EQ3. Specifically, the look up table is indexed with the integer portion of distance D_NEAR, which is equal to transformed V chrominance value V_T multiplied by the tangent of color nearness angle CNA_X. The value in the look up table is equal to one divided by the sum of distance D_NEAR plus 1. Equation EQ4 shows symbolically the value in each entry of the look up table.

$$LUT(INT(D\_NEAR)) = 1/(D\_NEAR+1) \quad (EQ4)$$

For embodiments using the look up table, color specific chrominance adjustment factor CSCAF_X equals one plus chrominance control factor CCF_X multiplied by one minus the absolute value of transformed U chrominance value U_T multiplied by the value of the look up table at the integer portion of distance D_NEAR, where D_NEAR is equal to transformed V chrominance value V_T multiplied by the tangent of color nearness angle CNA_X. Equation EQ5 shows symbolically the formula for color specific chrominance adjustment factor CSCAF_X using a look up table.

$$CSCAF\_X = 1 + CCF\_X*(1 - ABS(U\_T)*LUT(INT(D\_NEAR))) \quad (EQ5)$$

The size of the look up table is dependent on the range of the chrominance values and color nearness angle CNA_X. Specifically, the size of the minimum size of the look up table is equal to the integer portion of the product of the maximum value of the chrominance value V_T and the tangent of color nearness angle CNA_X.

As described above, the saturation of current pixel is adjusted by multiplying both U chrominance value U_C and V chrominance value V_C by pixel chrominance adjustment factor PCAF. However, chrominance values are typically bounded in a chrominance range C_RANGE between a minimum chrominance value C_MIN and a maximum chrominance value C_MAX, inclusive. For example, if 8 bits were used for U/V chrominance values, minimum chrominance value C_MIN would equal −128 and maximum chrominance value C_MAX would equal to 127. If a chrominance value is computed to be outside of chrominance range C_RANGE, the chrominance value would be truncated to equal minimum chrominance value C_MIN (for negative chrominance values) or to equal maximum chrominance value C_MAX (for positive chrominance values). If adjustment by pixel chrominance adjustment factor PCAF would cause either chrominance value to go beyond the chrominance range C_RANGE, color distortion would occur. For example, if pixel chrominance adjustment factor PCAF is equal to 1.2, U chrominance value U_C is equal to 120 and V chrominance value V_C is equal to 40. Simply multiplying the chrominance values by pixel chrominance adjustment factor PCAF would result in adjusted U chrominance value U_A being equal to 127 (i.e., 144 truncated to 127) and adjusted V chrominance value V_A being equal to 48. Thus, the adjusted chrominance ratio U_A/V_A is equal to 127/48 which is not equal to the original chrominance ratio U_C/V_C, which is equal to 120/40. Therefore, some embodiments of the present invention avoids color distortion, by using a scaled pixel chrominance adjustment factor SPCAF in place of pixel chrominance adjustment factor PCAF, when color distortions due to range limitations on the chrominance values would occur. Specifically, the color saturation control unit described in U.S. patent application Ser. No. 10/839,759, filed May 3, 2004, entitled "Chrominance Control Unit and Method For Video Images" by Zhu, which is incorporated herein by reference, can be used with the present invention.

In the various embodiments of the present invention, novel structures and methods have been described for adjusting a set of selected colors without significantly changing the appearance of non-selected colors. The various embodiments of the structures and methods of this invention that are described above are illustrative only of the principles of this invention and are not intended to limit the scope of the invention to the particular embodiments described. For example, in view of this disclosure those skilled in the art can define other chrominance adjustment units, multipliers, chrominance multipliers, color spaces, color specific chrominance adjustment factors, pixel chrominance adjustment factors, transformed color spaces, color identification parameters, color nearness angles, color vectors, coordinate transformation units, adjustment calculation units, color nearness factors, chrominance control factors, look-up tables, and so forth, and use these alternative features to create a method, circuit, or system according to the principles of this invention. Thus, the invention is limited only by the following claims.

What is claimed is:

1. A method of enhancing an image comprising:
   determining whether a current color of a current pixel is near a selected color;
   calculating a color specific chrominance adjustment factor based on the current color and the selected color; and
   adjusting the current color of the current pixel with the color specific chrominance adjustment factor when the current color of the current pixel is near the selected color.

2. The method of claim 1, wherein the determining whether a current color of a current pixel is near the selected color, further comprises determining whether the current color lies within a color nearness angle of a selected color vector representing the selected color.

3. The method of claim 1, wherein the determining whether a current color of a current pixel is near the selected color, further comprises determining whether the current color lies between a first color vector and a second color vector.

4. The method of claim 3, wherein the first color vector is a color nearness angle less than a color angle of the selected color vector and the second color vector is the color nearness angle greater than the color angle of the selected color vector.

5. The method of claim 1, wherein the determining whether a current color of a current pixel is near the selected color, further comprises transforming a color space so that the selected color vector lies on a first coordinate axis of a transformed color space.

6. The method of claim 5, wherein the determining whether a current color of a current pixel is near the selected color, further comprises determining whether the current pixel in the transformed color space is within a color nearness angle of the first coordinate axis.

7. The method of claim 5, wherein the first coordinate axis is a transformed V chrominance axis.

8. The method of claim 5, wherein the determining whether a current color of a current pixel is near the selected color, further comprises:
   calculating a current distance of the current pixel in the transformed color space from the first coordinate axis;
   calculating a nearness distance based on a coordinate of the current pixel in the transformed color space and a color nearness angle.

9. The method of claim 8, wherein the nearness distance is equal to a coordinate of the current pixel multiplied by the tangent of the color nearness angle.

10. The method of claim 8, wherein the color specific chrominance adjustment factor is equal to one plus a color control factor multiplied by the difference of one and the current distance divided by the sum of one and the nearness distance when the nearness distance is greater than or equal to the current distance and wherein the color specific chrominance adjustment factor is equal to one when nearness distance is less than the current distance.

11. The method of claim 1, wherein the color specific chrominance adjustment factor is proportional to a distance in a color space between the current pixel and the selected color.

12. The method of claim 1, wherein the adjusting the current color of the current pixel with the color specific chrominance adjustment factor when the current color of the current pixel is near the selected color comprises multiplying a U chrominance value and a V chrominance value of the current pixel by the color specific chrominance adjustment factor.

13. A method of enhancing an image comprising:
   selecting a set of selected colors;
   determining whether a current pixel is near each color of the set of selected colors;
   calculating a color specific chrominance adjustment factor for each of the selected color to create a set of color specific chrominance adjustment factors;
   calculating a pixel chrominance'adjustment factor based on the set of color specific chrominance adjustment factors; and
   adjusting the color of the current pixel with the pixel chrominance adjustment factor.

14. The method of claim 13, wherein the determining whether a current pixel is near each color of the set of selected colors, further comprises determining whether the current color lies within a color nearness angle of a selected color vector representing one of the selected color.

15. The method of claim 13, wherein the determining whether a current pixel is near each color of the set of selected colors, further comprises determining whether the current color lies between a first color vector and a second color vector.

16. The method of claim 13, wherein the determining whether a current pixel is near each color of the set of selected colors, further comprises transforming a color space so that a selected color vector lies on a first coordinate axis of a transformed color space.

17. The method of claim 16, wherein the determining whether a current pixel is near each color of the set of selected colors, further comprises determining whether the current pixel in the transformed color space is within a color nearness angle of the first coordinate axis.

18. The method of claim 17, wherein the transforming a color space so that a selected color vector lies on a first coordinate axis of a transformed color space and the determining whether the current pixel in the transformed color space is within a color nearness angle of the first coordinate axis are repeated for each of the selected colors.

19. The method of claim 16, wherein the determining whether a current pixel is near each color of the set of selected colors further comprises:
   calculating a current distance of the current pixel in the transformed color space from the first coordinate axis;
   calculating a nearness distance based on a coordinate of the current pixel in the transformed color space and a color nearness angle.

20. The method of claim 19, wherein the nearness distance is equal to a coordinate of the current pixel multiplied by the tangent of the color nearness angle.

21. The method of claim 13, wherein the pixel chrominance adjustment factor is equal to the product of the set of color specific chrominance adjustment factors.

22. The method of claim 13, wherein adjusting the color of the current pixel with the pixel chrominance adjustment factor, comprises multiplying a U chrominance value and a V chrominance value of the current pixel by the pixel chrominance adjustment factor.

23. A chrominance adjustment system comprising:
   a first chrominance adjustment unit configured to generate a first color specific chrominance adjustment factor for a first selected color;
   a second chrominance adjustment unit configured to generate a second color specific chrominance adjustment factor for a second selected color;
   a multiplier coupled to the first of chrominance adjustment unit and the second chrominance adjustment unit and configured to generate a pixel chrominance adjustment factor by multiplying the first color specific chrominance adjustment factor with the second color specific chrominance adjustment factor; and a chrominance multiplier coupled to the multiplier and configured to generate an adjusted U chrominance value and an adjusted V chrominance value.

24. The chrominance adjustment system of claim 23, further comprising a third chrominance adjustment unit coupled to the multiplier and configured to generate a third color specific chrominance adjustment factor for a third selected color; and wherein the multiplier is configured to multiply the third color specific chrominance adjustment factor with the first color specific chrominance adjustment factor and the second color specific chrominance adjustment factor.

25. The chrominance adjustment system of claim 23, wherein the first chrominance adjustment unit further comprises:
   a coordinate transformation unit; and
   an adjustment calculation unit coupled to the coordinate transformation unit.

26. The chrominance adjustment system of claim 25, wherein the coordinate transformation unit receives a current U chrominance value and a current V chrominance value of a current pixel and generates a transformed U chrominance value and a transformed V chrominance value, wherein a color vector corresponding to the first selected color lies on the transformed V chrominance axis of a transformed color space.

27. The chrominance adjustment system of claim 25, wherein the coordinate transformation unit is configured to determine whether a current pixel in a transformed color space is within a color nearness angle of a first coordinate axis of the transformed color space.

28. The system of claim 25, wherein the adjustment calculation unit is configured to calculate a current distance of a current pixel in a transformed color space from a first coordinate axis and to calculate a nearness distance based on a coordinate of the current pixel in the transformed color space and a color nearness angle.

29. The chrominance adjustment system of claim 23, wherein the first chrominance adjustment unit is configured to determine whether a current color of a current pixel is near the first selected color.

* * * * *